United States Patent
Thomas

[11] Patent Number: 5,100,081
[45] Date of Patent: Mar. 31, 1992

[54] AIRCRAFT CONTROL SYSTEM

[76] Inventor: Dieter Thomas, Buchenstrasse 15a, D-8080 Fuerstenfeldbruck, Fed. Rep. of Germany

[21] Appl. No.: 722,357

[22] Filed: Jun. 19, 1991

Related U.S. Application Data

[63] Continuation of Ser. No. 106,047, Oct. 7, 1987, abandoned.

[30] Foreign Application Priority Data

Oct. 8, 1986 [DE]  Fed. Rep. of Germany ....... 3634250

[51] Int. Cl.$^5$ .............................................. B64C 13/04
[52] U.S. Cl. ...................................... 244/75 R; 244/91; 244/220
[58] Field of Search ................... 244/87, 88, 89, 220, 244/221, 229, 230, 232, 233, 234, 235, 91, 213, 16

[56] References Cited

U.S. PATENT DOCUMENTS

| | | | |
|---|---|---|---|
| 1,848,013 | 3/1932 | Hoekstra et al. | 244/90 R |
| 2,125,361 | 8/1938 | Schwarzler | 244/87 |
| 2,158,598 | 5/1939 | Watter | 244/87 |
| 2,172,813 | 9/1939 | Waterman | 244/225 |
| 2,264,233 | 11/1941 | Batts | 244/90 R |
| 2,303,695 | 12/1942 | Johnson | 244/230 |
| 2,323,352 | 7/1943 | Pitts | 244/233 |
| 2,442,289 | 5/1948 | Garehime | 244/237 |
| 2,460,374 | 2/1949 | Walls | 244/233 |
| 2,518,012 | 8/1950 | Horkey | 244/233 |
| 2,649,265 | 8/1957 | Grant | 244/91 |
| 2,697,567 | 12/1954 | Fiedler | 244/233 |
| 2,697,568 | 12/1954 | Powers | 244/87 |
| 2,705,117 | 3/1955 | Ross | 244/233 |
| 3,463,419 | 8/1969 | Rashidian | 244/87 |

FOREIGN PATENT DOCUMENTS 416879  9/1934  United Kingdom ................. 244/87

*Primary Examiner*—Galen Barefoot
*Attorney, Agent, or Firm*—R. H. Siegemund

[57] ABSTRACT

An aircraft having a wing with trailing edge control flaps and with upwardly extending winglets at the outer wind ends, the winglets being provided with rudder surfaces, the craft has the usual control stick and left and right foot pedals, is improved by a cable directly connecting the rudder surfaces to the control stick for lateral control of the aircraft through operation of the rudder surfaces by the control stick. Another cable directly connects the trailing edge flaps to the foot pedals for further lateral control operation of the flaps through the foot pedals. The two cables are decoupled from each other and constructed so that the rudder surfaces can be controlled by the control stick even when the foot pedals hold the flaps in position, and the control flaps can be controlled by the foot pedals even if the control stick holds the rudder surfaces in position.

6 Claims, 2 Drawing Sheets

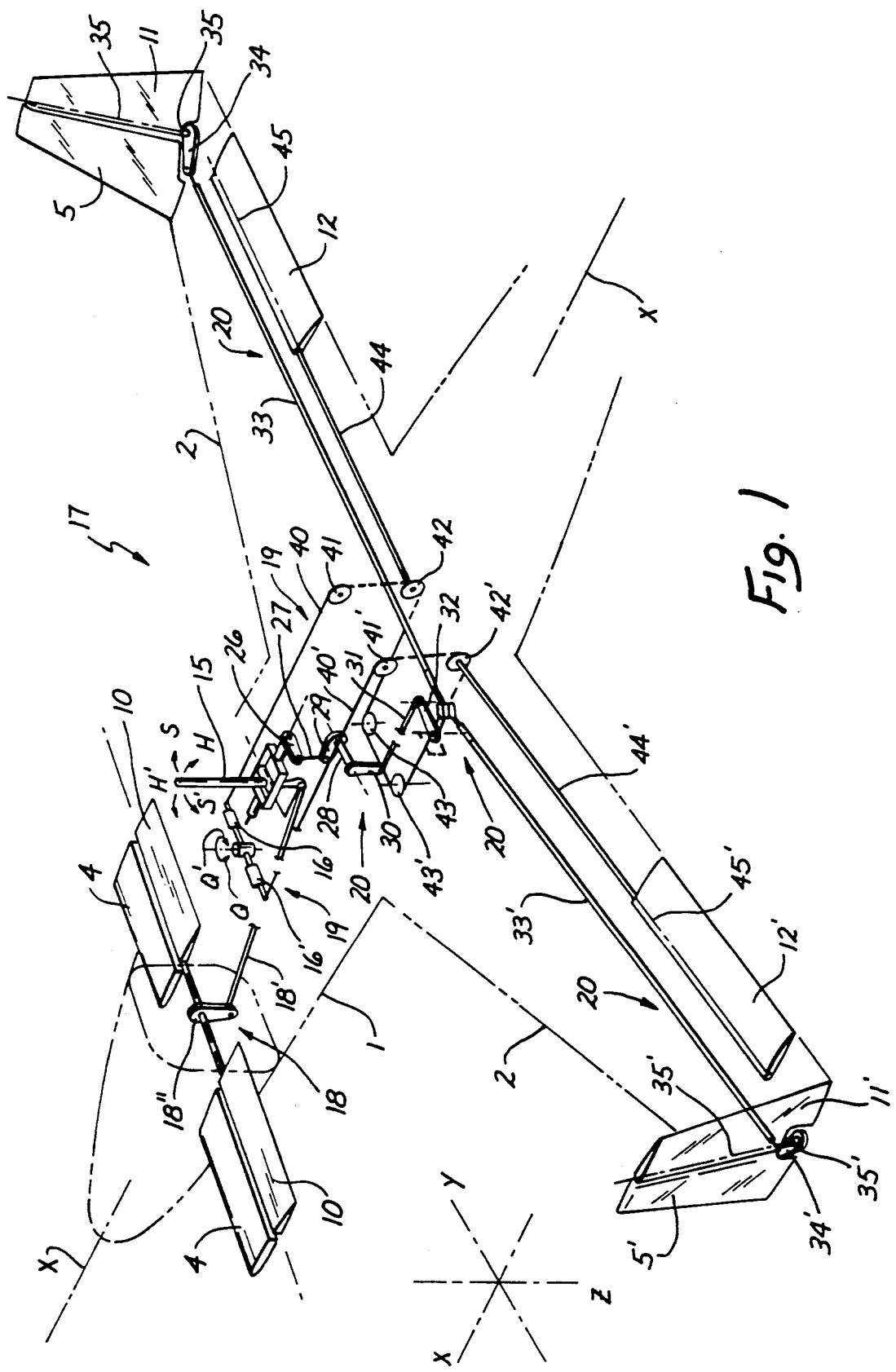

AIRCRAFT CONTROL SYSTEM

This is a continuation of co-pending application Ser. No. 106,047 filed on Oct. 7, 1987, now abandoned.

BACKGROUND OF THE INVENTION

The present invention relates to the control of aircraft under inclusion of transverse or lateral control surfaces, control drives, and appropriate transmission gearing and/or linkage, also including rudders with appropriate surfaces, control structures, transmission, etc., and more particularly, the invention relates to aircraft having wings with so-called winglets at their end, wherein specifically the winglets carry the side rudders.

Aircraft with delta or back-swept wings often have winglets at the wing ends. These winglets have a V-position in relation to the wing proper, or are oriented upright. It happens that the control surfaces arranged on these winglets and serving as rudders are located farther from the center of gravity of the aircraft than the conventional control surfaces of flaps used for transverse or lateral control and being arranged along the trailing edge of the wing, transverse or lateral control being provided in relation to the longitudinal axes of the craft. The same is true for other wing configurations including those wherein the ends of the wings still coincide more or less with the main plane of extension of the wings as a whole, as in the case, for example, in an aircraft with delta wings. From a general point of view, and owing to particular construction aspects, the point of attack of the air pressure forces acting on the flaps along the trailing edge of the wing on both sides are closer to the center of gravity than the points of air force acting on the winglets at the end of the wing, of course, assuming comparable wing spans.

For controlling aircraft as above, one uses lift producing elements as well as drag producing elements, such as spoilers. In the case of other kind of aircraft, including those of a so-called tail first wing configuration, the effect of side and rudder control and of transverse or lateral control, can be exchanged or appear exchanged under certain conditions of flight, because both kinds of control are in effect quite similar, almost identical. It is known to provide rudder surfaces for compensating interference such as yaw as well as for roll control. See here, for example, German Patent No. 28 09 244. Also, it is known to use flaps at the end portion of the wings for purposes of control or breaking. Flap deflections may even be similarly oriented on both wings or oppositely with corresponding different effects. In the case of uniform deflection the effects add. See here, for example, German printed patent application No. 35 15 976.

DESCRIPTION OF THE INVENTION

It is an object of the present invention to provide a new and improved control for aircraft which facilitates operation and control so that the operation of rudder and transverse or laterally effective control surfaces can be carried out conventionally, even if the effect deviates from the conventional one, that is to say the effect produced is different but the rudders are still pedal-controlled while lateral deflection of the control stick provides for the transverse or lateral control of the aircraft.

In accordance with the preferred embodiment of the present invention, the objects are obtained in that conventionally effective rudder surfaces are arranged on the wing end winglets and are connected through a transmission to the control stick, while rear end flaps or trailing end flaps, provided for the transverse control, are connected to the foot pedals of the pilot. The transmissions are constructed to interpose directionally dependent resting periods. Delinearization is provided to obtain the requisite adjustment for the control surfaces in relation to each other, equivalent to directionally effective differentiation of the control stick or pedal movements.

Delinearization devices downstream from the foot pedal and/or steering column, i[strea, frp, the control surfaces or flaps are provided to obtain roll or yaw adjustment, corresponding to the respective control member deflection. Only one or the other control surface is adjustable from neutral position initially, corresponding to the inner curve path.

Upon constructing a control for an aircraft in accordance with the invention, one obtains an unconventional use and effect of otherwise conventionally operating control surfaces such as a rudder. But this way releases the pilot from the duty to have to react to reverse effects on the rudders, and to "re-think" the operation. Moreover, the inventive configuration permits the reduction of interference produced, for example, independently upon drag increases on the control surfaces which have to be relatively large in order to compensate the reverse effect on the rudder.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

FIG. 1 is a perspective schematic view of an aircraft with winglets and back-swept wings and tail first wings for elevations, further showing schematically the various control surfaces and their operation;

Figure 2A:
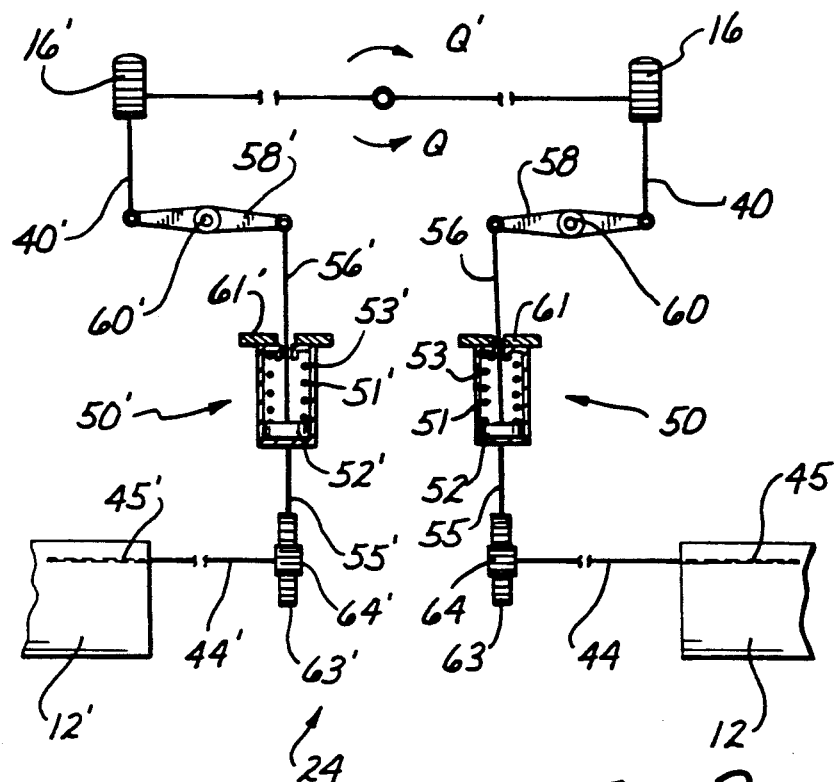
FIG. 2a is a detail of a control transmission path in the aircraft in accordance with FIG. 1 leading from foot pedals to trailing edge flaps.

Proceeding with the detailed description of the drawings the aircraft shown in the figure has a fuselage 1 and wings 2, constituting the main lift providing surfaces. Small, tail first-like wings 4 are provided at the front of the fuselage while winglets 5 and 5' are positioned at the end of the two wings. These winglets are not exactly perpendicular (vertical) to the main plane of extension of the wings, but are slightly inclined in outer direction. Moreover, in the illustrated configuration, the wings 2 have also a trailing edge arrow, i.e. back swept, configuration. The aircraft itself includes a plurality of propulsion engines which maybe connected to the fuselage in the aft portion of the fuselage, which portion is not shown and is situated to the lower right of the drawing in FIG. 1.

The control structure 17 for the aircraft includes elevator surfaces 10 being along the trailing edges of the wings 4. Further elevator control surfaces are 11 and 11' at the wing ends or winglets 5 and 5', as well as control surfaces or flaps 12 or 12' along the trailing edge of the wings 2. This general control structure 17 of the craft, moreover, includes, broadly speaking, transmissions 18 (to the elevators 10), 19 (to surfaces 11, 11') and 20 (to flaps 12, 12'). In addition, there is a control stick 15, operated by the pilot in the usual fashion, side to side, and forward and reverse. There are foot pedals 16 and 16'. The control stick 15 is connected through the transmission 18 to the elevators 10 on the wings 4, to move the elevators for ascent and decent. For this, control stick is moved conventionally forward (H') or towards the pilot. In addition, the control stick is connected (responding to lateral movements S, S') through the transmission 20 to the winglets and their control surfaces 11 and 11'. The trailing edge flaps 12 and 12' are connected to the foot pedals 16, 16' through transmission 19.

The operating members such as the control stick 15, on one hand, and the foot pedals 16 and 16', on the other hand, will operate and function in a manner different from conventional operations as will be described later. Presently, it is mentioned that the embodiment of the control structure 17, as shown in FIG. 1, includes in its control transmission 18, a control rod linkage 18' which in a conventional manner is connected at one end to the control stick 15 being operated by the pilot, and through a crank lever 18", the linkage 18' has its other end connected to a common shaft operating the two elevators 10. The operation obtains conventionally through forward and reverse, pushing and pulling of the control stick 15. Just considering elevational control, and using as a reference the neutral position, the position as shown in FIG. 1, and the directions H and H', respectively, identify climbing and descending as already stated above.

The trailing edge wing flaps 12 and 12' are controlled differently from conventional mode control. Conventionally, trailing edge flaps such as 12 and 12' are used as lateral rudder elements for modifying the roll position of the craft vis-a-vis the longitudinal axes X. Presently, these trailing edge flaps 12 and 12' are connected to the control transmission 19, and are used here for lateral rudder determination yaw control. Thus, the control linkage or transmission 19 is connected to the surfaces 12 and 12', and the respective other end (functionally) is connected to the foot pedals 16 and 16', with 12 being connected to 16, and 12' connected to 16'. Thus far this connection is conventional.

The control transmission 19 includes two cable portions 40 and 40'. These cable portions are connected to one or the other side of the pedal pivot axis of pedals 16 and 16'. The other end, so to speak, of the cable portions 40 and 40' are respectively connected to control shafts 44, 44' for control the surfaces and flaps 12 and 12', on one or the other side of the plane of the craft, respectively. The cable parts 40 and 40', however, are interconnected through deflection pulleys; specifically, they run through and over deflection pulleys 41, 41'; 42, 42'; and 43, 43', with the prime always indicating one side and absence of prime the other side, in relation to the axis X of the craft. The cable sheaves or pulleys 42 and 42' have fixed axis and are fixed to the control shafts 44 and 44', respectively. These shafts hold rigidly the surfaces 12 and 12', respectively, through pivot axes 45 and 45', respectively. The adjustment direction of the pedal 16 and 16', in accordance with FIG. 1, are identified by the character Q' for pivoting in clockwise direction, and Q stands for counterclockwise operation which, as far as conventional rudder operation is concerned, corresponds, in that Q denotes "right", and Q' denotes "left". This obtains through deflection in opposite direction of the surfaces 12 and 12', using the transmission structure in accordance with the invention.

In a suitable location and point within the train (19) of movement transmission, for example, in the closed loop cable structure 40 and 40', a distorting or delinearizing transmission 24 is interposed which is shown separately in FIG. 2a. Its task is to obtain a deflection of the control surfaces 12 and 12' in one direction or the other with reference to a mean or neutral position of these control surfaces. For this, then, transmission 24 includes two bridging devices 50 and 50', one for each of the sides, which means that for each of the control surfaces or flaps 12 and 12' on or the other side of the aircraft, a separate bridging structure is provided, such as 50 for one, and 50' for the other side. These bridging structures, each include a cylinder, 51 and 51', respectively, for axially movable pistons 52 and 52', respectively, operating against the effect of compression springs 53 and 53', respectively. Stationary steps 61 and 61' are respectively associated with the cylinders 51 and 51'. Moreover, as far as the closed loop- cable configurations 40 and 40' are concerned, they obtain a tensioning device which is biased to take up the cable tension. Thee bridging devices 50 and 50' with reference to any control movement as initiated, for example, by the pedals 16 and 16', is operatively directed in opposite direction, that is with reference of the movement of the surfaces 12 and 12'.

Thrust rods 55 and 55' act on cylinders 51 and 51', respectively, while thrust rods 56 and 56', respectively, connect to the pistons 52 and 52'. The rods 56 and 56' are fastened to twin pivot levers 58 and 58', respectively, pivoting about the axes 60 and 60', respectively. On the other hand, the thrust rods 55 and 55' are respectively connected to gear rods 63 and 63'. The free ends of the levers 58 and 58' are connected, respectively, to ends of the cable 40 and 40', respectively. On the other hand, the gear rods 63 and 63' engage pinions 64 and 64', respectively, which are secured and mounted on the control shafts 44 and 44' for the flaps 12, 12'.

It can be seen from FIG. 1, the control of the surfaces 11 and 11', being located along the trailing edges of the winglets 5 and 5', is not carried out in a conventional manner, rather these surfaces act as rudders for changing the position of the crafts in relation to and on the vertical axis 2 of the craft. Control obtains through the transmission 20, providing specifically in this case and in deviation from conventional practice, for the transverse control. The transmission 20 begins, so to speak, at the cardanically suspended control column or control stick 15. A lever 26 is connected thereto, and is also connected to a rod 27. The connection leads ultimately to actuator rods 33 and 33', respectively for the two control surfaces 11 and 11'. The connection runs from the control stick 15 through the lever 26, a rod 27, a shaft 28, levers 29 and 30, respectively, a rod 31, an angle lever 32, to the two rods 33 and 33'. These control or actuator rods 33 and 33' operate levers 34 and 34', respectively, on shafts 35 and 35', respectively, to which are linked and connected the flaps 11 and 11'.

Figure 2B:
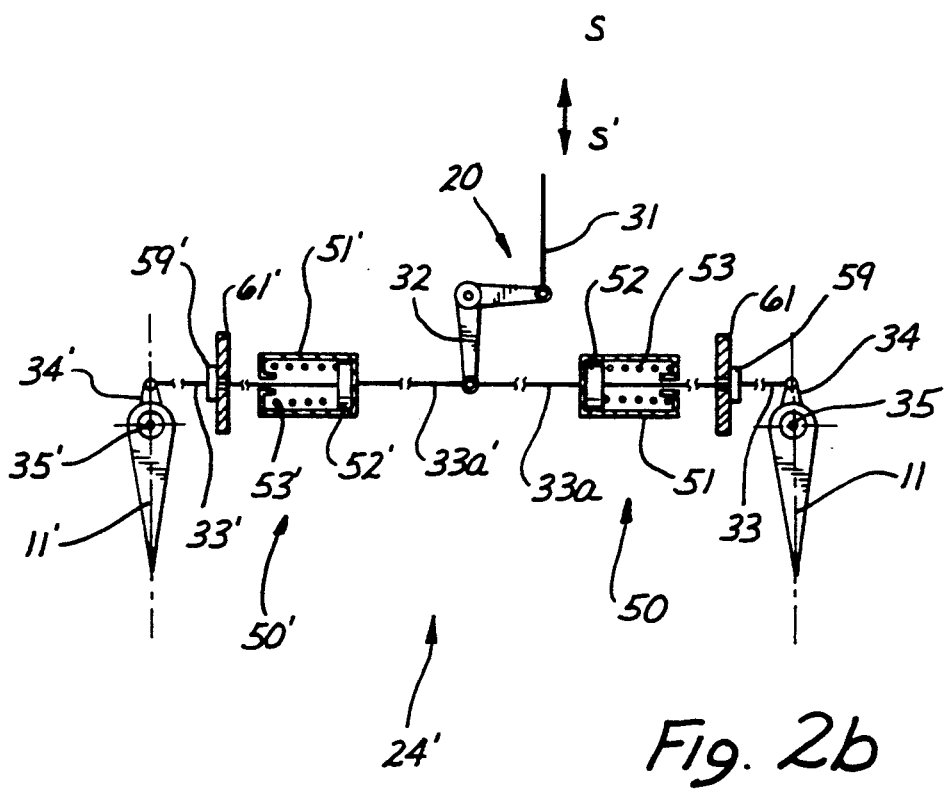
FIG. 2b is a different detail of a control transmission, also shown in a schematic fashion, and involving the control surfaces of the winglets as controlled by means of the control stick.

FIG. 2b illustrates by way of example, the transmission 20 for operating the surfaces 11 and 11' but now in conjunction with a distorting or delinearizing transmission 24'. Specifically then, the rod 31 connects to the parts 33, 33', and 38, 38', respectively, through the angle lever 32. These parts, in turn, are connected to levers 34 and 34', which act on the and are connected to the flap axes 35 and 35' of the surfaces 11 and 11'. Now, analogous to the arrangements in FIG. 2a, bridging structures 50 and 50' are inserted, so to speak, in the rod linkage 33 and 33', respectively. Again, they include in each instance a cylinder housing such as 51 and 51', respectively, with piston 52 and 52' being slidably therein, as well as spring bias 53 and 53' to be effective as between piston and cylinders in each instance. The cylinder housing or casing 51 or 51' is connected to the rods 33a and 33a', respectively, while the pistons 52 and 52', respectively, are connected to the rod parts 33 and 33'. In addition, there are stops provided 61 and 61', cooperating with counter-stops 59 and 59' which counter-stops are secured to the rods 33 and 33'.

The operation of the control is as follows. Assuming the craft is supposed to fly in a curve. This then is initiated by a dominating roll control in that the control column 15 is moved in the direction (S or S', of course, depending on the direction of the curve). The respectively associated control transmission 20 in conjunction with the delinearizing and distorting transmission 24', causes now the one or the other of the surfaces 11 or 11' to be deflected. A secondary operation is added to the primary deflection. The pilot operates the foot pedal 16 and 16' and here a dominating yaw control is provided through transmission 19 as well as the interposed delinearizing transmission 24, shown in FIG. 2a. This then causes either the surface 12 or the surface 12' to be deflected from the neutral position depending upon the direction of actuation.

The secondary effects of the two rudder operations generally, and therefore, the deflections of surfaces 11, 11', or 12, as well as 12' have to be correct in terms of direction to the corresponding conventional rudder (yaw) operation. That means in the case of a lateral control to the right by means of deflection of the surface 11 a small yaw moment is to be effective to the right. In the case of just lateral rudder operation to the right, through the deflection of the surface 12, a small roll momentum to the right is to be produced.

The magnitude of the secondary effects on deflection of the surfaces 11, 11'; 12, 12', is determined by the differentiation with reference to the magnitude of the deflecting operation as initiated, and the direction of the control surfaces 11 and 11', respectively, vis-a-vis the control surfaces 12 and 12'. It is also true as far as the relationship between the control deflection of the surfaces 11 and 11', on one hand, and of flaps 12 and 12', on the other hand, in relation to each other by means of the delinearizing transmission 24 and 24', or by means of another distorting transmission, not shown in details, and by means of which the member 15, on one hand, and 16 and 16', on the other hand, have their initiated control motion distorted, which means differentiated to obtain a modified control movement of the surfaces 11 and 11', on one hand, and 12 and 12', on the other hand, depending on the kind of control provided. Here then, the distorting or delinearizing transmission may include, in a manner known per se, step or latching transmissions, including lever elements or cam guides or something of that nature.

The transmissions 24 and 24', respectively, shown in FIGS. 2a and 2b, cause upon operation of the control stick 15, on one hand, or the pedal 16 or 16', on the other hand, only one of the control surfaces 11 and 11' to be deflected, or, in the other instances, 12 and 12', depending upon which of the control members has been operated. The respective other associated surface remains in a neutral position. On the one side, as far as control is concerned, the bridging device 50 (or 50') can be construed to operate as a rigid whole which transmits the initiated control movement upon the respective connected control surface (11 or 11' or 12 or 12'). On the other hand, the respective other bridging device 50' (or 50) bears against the stop 61' (or 60), and causes adjustment of the respective piston 52' (or 52), against the effect of the spring 53' (or 53), to thereby provide a bridging motion, so that respectively the connected control surface does remain in the neutral resting position while the control transmission, so to speak, idles through the control movement.

It should be noted that the device explained above was specifically explained with reference to specific control operations as initiated by control stick, on one hand, and foot pedal, on the other hand. This ties the aircraft control to a conventional operation. However, analogously, manual operation or auto-pilot operation can likewise be accommodated in the same fashion. The invention is not limited to these embodiments, including the one described above, but all changes and modifications thereof not constituting departures from the spirit and scope of the invention are intended to be included.

I claim:

1. In an aircraft having a wing with upwardly extending winglets at respective outer wing ends, the winglets being provided with rudder surfaces, the wings further provided with trailing edge control flaps, the craft having the usual control stick and left and right foot pedals, the improvement comprising:

first means for directly connecting the rudder surfaces to the control stick for lateral control of the aircraft through operation of the rudder surfaces by means of the control stick;

second means for directly connecting the trailing edge flaps, respectively, to the foot pedals for further lateral control operation of the flaps through the foot pedals; and said first means and second means being decoupled from each other and constructed so that the rudder surfaces can be controlled by the control stick even when the foot pedals hold the flaps in position, and the control flaps can be controlled by the foot pedals even if the control stick holds the rudder surfaces in position.

2. The improvement as in claim 1, there being a left side rudder surface and a right side rudder surface and a left side control flap and a right side control flap; the improvement including delinearizing means for causing the control stick and the foot pedal movements to be transmitted differently to left and right side flaps, and left and right side rudder surfaces.

3. The improvement as in claim 1, both of said respectively means provide for deflection of those of the flaps and rudder surfaces which are on the inside of a contemplated flight path curve.

4. The improvement as in claim 1, both of the means including differentiation of control movements as provided by the stick and the pedals.

5. The improvement as in claim 1, the first means including two cylinder means connected to the stick and moved oppositely on pivoting of the control stick in a particular lateral direction;

a spring-biased piston in each cylinder means, connected to one or the other of the flaps, to have movement transmitted directly upon one of the flaps while the other one remains in a neutral position.

6. In an aircraft having a wing with upwardly extending winglets at respective outer wing ends, the winglets being provided with rudder surfaces, the wings further provided with trailing edge control flaps, the craft having the usual control stick and left and right foot pedals, the improvement comprising:

first means including cable means, for directly connecting the rudder surfaces to the control stick for lateral control of the aircraft through operation of the rudder surfaces by means of the control stick;

second means including cable means, for directly connecting the trailing edge flaps, respectively, to the foot pedals for further lateral control operation of the flaps through the foot pedals; and said cable means of the first and second means being decoupled from each other and constructed so that the rudder surfaces can be controlled by the control stick even when the foot pedals hold the flaps in position, and the control flaps can be controlled by the foot pedals even if the control stick holds the rudder surfaces in position.

* * * * *